(12) United States Patent
Díaz-Blanco et al.

(10) Patent No.: US 10,890,136 B2
(45) Date of Patent: Jan. 12, 2021

(54) PISTON, IN PARTICULAR FOR AN HPDI DIESEL/GAS INTERNAL COMBUSTION ENGINE

(71) Applicant: MAN Truck & Bus AG, Munich (DE)

(72) Inventors: Bruno Barciela Díaz-Blanco, Nuremberg (DE); Dirk Peter Weberskirch, Fürth (DE); Andreas Sommermann, Heilsbronn (DE); Marcus Stein, Spardorf (DE); Tim Dressel, Nuremberg (DE)

(73) Assignee: MAN TRUCK & BUS AG, Munich (DE)

( * ) Notice: Subject to any disclaimer, the term of this patent is extended or adjusted under 35 U.S.C. 154(b) by 0 days.

(21) Appl. No.: 16/196,210

(22) Filed: Nov. 20, 2018

(65) Prior Publication Data

US 2019/0153976 A1    May 23, 2019

(30) Foreign Application Priority Data

Nov. 20, 2017  (DE) .......... 10 2017 127 291

(51) Int. Cl.
*F02B 23/06* (2006.01)
*F02F 3/26* (2006.01)
(Continued)

(52) U.S. Cl.
CPC ............... *F02F 3/26* (2013.01); *F02B 7/06* (2013.01); *F02B 23/06* (2013.01);
(Continued)

(58) Field of Classification Search
CPC .. F02B 23/06; F02B 23/0651; F02B 23/0672; F02F 3/26
(Continued)

(56) References Cited

U.S. PATENT DOCUMENTS 8,276,563 B2 * 10/2012 Quigley .............. F02B 23/0693
                                                      123/193.6
9,476,346 B2 * 10/2016 Zoeller .............. F02B 23/0693
(Continued)

FOREIGN PATENT DOCUMENTS

DE    102006020642 A1    11/2007
DE    112008002527       8/2010
(Continued)

OTHER PUBLICATIONS

European Office Action issued in European Patent Application No. 18195591.5 dated Jan. 31, 2020, 6 pages. No English translation available.

*Primary Examiner* — George C Jin
*Assistant Examiner* — Teuta B Holbrook
(74) *Attorney, Agent, or Firm* — Weber Rosselli & Cannon LLP

(57) ABSTRACT

A piston for an internal combustion engine, such as a high-pressure direct injection (HPDI) diesel/gas internal combustion engine. The piston has a piston recess, in particular an omega piston recess. The piston has a piston crown face which is provided so as to extend annularly about a centre axis (M) of the piston. The piston has a plurality of piston stages, which are provided so as to extend annularly about the centre axis (M) and which are arranged between the piston crown face and the piston recess. The piston geometry can lead to an increase of the degree of engine efficiency with a simultaneous reduction of the exhaust emissions.

17 Claims, 5 Drawing Sheets

(51) Int. Cl.
  *F02B 7/06* (2006.01)
  *F02B 43/00* (2006.01)
(52) U.S. Cl.
  CPC ...... *F02B 23/0651* (2013.01); *F02B 23/0672* (2013.01); *F02B 43/00* (2013.01)
(58) Field of Classification Search
  USPC .............................................. 123/196.6, 279
  See application file for complete search history.

(56) References Cited

U.S. PATENT DOCUMENTS

| | | | | |
|---|---|---|---|---|
| 10,113,503 | B2* | 10/2018 | Bowditch | F02F 1/242 |
| 2005/0115537 | A1* | 6/2005 | Liu | F02B 23/0672 |
| | | | | 123/276 |
| 2006/0070603 | A1* | 4/2006 | Stanton | F02B 23/0651 |
| | | | | 123/298 |
| 2010/0258077 | A1* | 10/2010 | Asai | F02B 23/0651 |
| | | | | 123/294 |
| 2017/0096978 | A1* | 4/2017 | Martinez | F02B 23/0693 |
| 2017/0145901 | A1* | 5/2017 | Uehara | F02B 23/0621 |
| 2017/0145951 | A1* | 5/2017 | Malik | F02F 3/24 |
| 2019/0136794 | A1* | 5/2019 | Cho | F02F 3/28 |

FOREIGN PATENT DOCUMENTS

| | | | | |
|---|---|---|---|---|
| DE | 102009025404 A1 * | 1/2011 | | F02F 3/28 |
| DE | 102009032941 A1 * | 1/2011 | | F02B 23/06 |
| DE | 102011056519 A1 | 4/2013 | | |
| DE | 102013022040 A1 | 6/2015 | | |
| DE | 102015012541 A1 | 4/2016 | | |
| DE | 102016116046 A1 * | 3/2017 | | F02F 3/00 |
| DE | 102016116046 A1 | 3/2017 | | |
| DE | 102016122500 A1 * | 6/2017 | | F02F 3/28 |
| JP | 04103827 A * | 8/1990 | | F02B 23/06 |
| JP | 2004190573 A | 7/2004 | | |
| WO | WO-2006058640 A1 * | 6/2006 | | F02B 23/06 |
| WO | WO-2009038044 A1 * | 3/2009 | | F02B 23/06 |
| WO | 2013047574 A1 | 4/2013 | | |
| WO | 2014196423 A1 | 12/2014 | | |
| WO | WO-2015117834 A1 * | 8/2015 | | F02B 23/06 |

* cited by examiner

FIG. 5

| Parameter | Range | Preferred range | Particularly preferred range |
|---|---|---|---|
| α | between 15° and 90° | between 40° and 80° | between 60° and 75° |
| β | between 0° and 60° | between 0° and 45° | between 15° and 45° |
| γ | between 0° and 60° | between 0° and 45° | between 15° and 45° |
| δ | between 0° and 60° | between 0° and 45° | between 15° and 45° |
| H0 | between 10 % and 50 % of D0 | between 10 % and 30 % of D0 | between 10 % and 20 % of D0 |
| H1 | between 2 % and 50 % of D0 | between 4 % and 15 % of D0 | between 5 % and 10 % of D0 |
| H2 | between 0 % and 60 % of D0 | between 0 % and 20 % of D0 | between 2 % and 10 % of D0 |
| H3 | between 0 % and 50 % of D0 | between 0 % and 10 % of D0 | between 1 % and 5 % of D0 |
| D0 | between 100 mm and 160 mm | | |
| D1 | between 40 % to 100 % of D0 | between 40 % and 80 % of D0 | between 40 % and 60 % of D0 |
| D2 | between 50 % and 95 % of D0 | between 60 % and 85 % of D0 | between 60 % and 70 % of D0 |
| D3 | between 30 % and 75 % of D0 | between 35 % and 70 % of D0 | between 40 % and 60 % of D0 |
| R1 | between > 0 mm and 200 mm | between > 0 mm and 50 mm | between 5 mm and 25 mm |
| R2 | between > 0 mm and 50 mm | between > 0 mm and 30 mm | between 5 mm and 15 mm |
| R3 | between > 0 mm and 30 mm | between 1 mm and 10 mm | between 2 mm and 6 mm |
| R4 | between > 0 mm and 10 mm | between 1 mm and 8 mm | between 1.5 mm and 6 mm |
| R5 | between > 0 mm and 10 mm | between > 0 mm and 8 mm | between 0.2 mm and 4 mm |
| R6 | between > 0 mm and 10 mm | between 1 mm and 8 mm | between 1.5 mm and 6 mm |
| R7 | between > 0 mm and 10 mm | between > 0 mm and 8 mm | between 0.2 mm and 4 mm |

PISTON, IN PARTICULAR FOR AN HPDI DIESEL/GAS INTERNAL COMBUSTION ENGINE

BACKGROUND

The present disclosure relates to a piston for an internal combustion engine, in particular an high pressure direct injection (HPDI) diesel/gas internal combustion engine, and an internal combustion engine having the piston.

In an HPDI diesel/gas internal combustion engine, gas fuel is used for driving and diesel fuel is used for igniting the gas fuel, wherein the gas fuel and the diesel fuel are injected under high pressure directly into the combustion chamber(s). HPDI diesel/gas internal combustion engines have the potential in comparison with purely diesel internal combustion engines to improve the degree of engine efficiency and to enable lower exhaust emissions. In order to utilise the potential of HPDI internal combustion engines, inter alia specially adapted piston geometries have to be developed. Until now, however, in particular in the utility vehicle sector, no or hardly any specially adapted piston geometries for HPDI diesel gas internal combustion engines are known.

DE 10 2013 022 040 A1 discloses a piston for a reciprocating piston internal combustion engine. The piston has a piston crown which extends in an annular manner in the peripheral direction of the piston and a piston stage which is arranged in a radial direction inside the piston crown and which extends in an annular manner. The piston stage is recessed with respect to the piston crown in an axial direction. The piston has an omega recess in which the piston stage merges via an annularly extending beam splitter contour. In a radial direction between the piston stage and the piston crown, a recess which is recessed with respect to the piston crown in an axial direction is arranged.

DE 10 2015 012 541 A1 discloses a piston for a gas engine having a piston recess. The piston has a piston crown which extends in an annular manner in the peripheral direction of the piston and an annularly extending piston stage which is arranged in a radial direction between the piston crown and the piston recess. The piston stage is recessed with respect to the piston crown in an axial direction and is raised with respect to the piston recess in an axial direction.

SUMMARY

An object of the present disclosure is to provide a piston geometry for an HPDI diesel/gas internal combustion engine which leads to an increase in the degree of efficiency of the engine together with a simultaneous decrease of the exhaust gas emissions.

The object is achieved by a piston according to the independent claim. Advantageous developments are set out in the dependent claims and the description.

The piston is suitable for an internal combustion engine, in particular an HPDI diesel/gas internal combustion engine. The piston has a piston recess, in particular an omega piston recess. The piston has a piston crown face which is provided so as to extend annularly about a centre axis of the piston. The piston has a plurality of piston stages which are provided so as to extend annularly about the centre axis and which are arranged between the piston crown face and the piston recess.

The piston geometry enables the division of the injected gas fuel and the diesel fuel into a first part-flow, which is guided along the piston recess, and a second part-flow which is guided along the plurality of piston stages. In the piston recess, the fuel may be directed in the direction towards the centre axis of the piston, wherein in the recess a turbulence of the part-flow can be adapted, in particular increased. Along the plurality of piston stages, a plurality of breakaway edges may be produced in order to adjust a turbulence of the second part-flow as desired. Consequently, the part-flows can optimise both the mixture formation processes and the combustion processes. A high degree of efficiency with an HPDI diesel/gas internal combustion engine is linked with such optimum mixture formation and combustion processes. A good mixture formation between air, gas fuel and diesel fuel leads to an adapted turbulence generation and an optimum combustion speed in the combustion chamber. This results in a high degree of efficiency and low engine-out emissions. One of the greatest challenges with HPDI diesel/gas internal combustion engines is the so-called glow ignition in which spontaneous combustion of the gas fuel which is undesirable in this instance occurs. The use of the oxygen available in the combustion chamber also has a very great significance. These two phenomena are inter alia influenced by three factors in the combustion chamber: the charge movement, the concentration distribution of the fuel and the temperature level. All three factors are dependent on the configuration of the piston geometry and may in particular be optimised by providing the piston geometry which is disclosed herein.

In particular, a swirling combustion method can be used in which the air inlet channel(s) of the cylinder is/are formed in such a manner that the inlet air is introduced into the cylinder with a swirl about the vertical axis of the cylinder (corresponds to the centre axis of the piston).

In a one embodiment, the plurality of piston stages have a (with respect to the centre axis) radially inner piston stage and a (with respect to the centre axis) radially outer piston stage. In particular, the radially outer piston stage may merge in a radial direction with respect to the centre axis into the radially inner piston stage. Consequently, in the second part-flow both on a breakaway edge of the radially inner piston stage and also (afterwards) on a breakaway edge of the radially outer piston stage, a turbulence can be generated in a selective manner. In addition, via the construction of the piston stages it is possible to selectively and successively influence how much fuel is directed further in the direction towards the cylinder wall.

In a further embodiment, the radially inner piston stage merges via a beam splitter contour which is provided in particular so as to extend annularly about the centre axis, advantageously in a radial direction with respect to the centre axis, into the piston recess. The beam splitter contour may divide the injected fuel into the first part-flow into the piston recess and into the second part-flow along the piston stages.

In another embodiment, the radially outer piston stage, in particular in a rounded manner, advantageously merges in a radial direction away from the centre axis into the piston crown face.

In an embodiment, the beam splitter contour is constructed as a projection which protrudes radially with respect to the centre axis. Alternatively or additionally, the beam splitter contour is provided with a predetermined radius in a range between a value greater than 0 mm and 30 mm, in particular between 1 mm and 10 mm, preferably between 2 mm and 6 mm. Alternatively or additionally, the beam splitter contour defines at a radially innermost location of the beam splitter contour an inner diameter which is in a range between 40% and 100%, in particular between 40% and 80%, preferably between 40% and 60%, of a piston outer diameter of the piston. Alternatively or additionally, the beam splitter contour (or the radially inner piston stage) in an axial direction along the centre axis is recessed with respect to the piston crown face in a range between 0% and 60%, in particular between 0% and 20%, preferably between 2% and 10%, of a maximum depth of the piston recess. In particular the combination of the parameters inner diameter at the beam splitter contour, radius of the beam splitter contour and height of the recess of the beam splitter contour determine the impact location of the gas and diesel jets on the piston. As a result of the appropriate combination of values of these parameters, there can be selected a suitable impact location, which assists during the turbulence generation and consequently supports the mixture formation and combustion process, as set out herein in greater detail in the description of the embodiment.

In another embodiment, the radially inner piston stage has a stage base, a stage wall and a transition region between the stage base and the stage wall. Preferably, the stage base of the radially inner piston stage is inclined with respect to a notional first plane which intersects with the centre axis at a right angle. Alternatively or additionally, the transition region of the radially inner piston stage is constructed with a predetermined radius. Alternatively or additionally, the stage wall of the radially inner piston stage is inclined with respect to the centre axis.

The stage base of the radially inner piston stage and/or the stage wall of the radially inner piston stage may be constructed in a planar manner.

The stage base of the radially inner piston stage and/or the stage wall of the radially inner piston stage may be constructed so as to rise in a radial direction away from the centre axis or so as to fall away in a radial direction towards the centre axis.

In another embodiment, the predetermined radius of the transition region of the radially inner piston stage is between a value greater than 0 mm and 10 mm, in particular between 1 mm and 8 mm, preferably between 1.5 mm and 6 mm. Alternatively or additionally, the stage wall of the radially inner piston stage is inclined at an angle between 0° and 60°, in particular between 0° and 45°, preferably between 15° and 45°, with respect to the centre axis. Alternatively or additionally, the stage wall of the radially inner piston stage merges over a predetermined radius in a range between a value greater than 0 mm and 10 mm, in particular between a value greater than 0 mm and 8 mm, preferably between 0.2 mm and 4 mm, into the radially outer piston stage. The suitable combination of values for the parameters radius of the transition region, radius of the transition between the piston stages, angle of the inclined stage wall and where applicable the difference of the recesses of the piston stages lead to a small production of soot during the combustion operation, as set out herein in greater detail in the description of the embodiment.

In a construction variant, the stage base of the radially inner piston stage is inclined at an angle between 0° and 60°, in particular between 0° and 45°, preferably between 15° and 45°, with respect to the notional first plane. Alternatively or additionally, the transition region defines at a radially innermost location of the transition region an inner diameter which is in a range between 50% and 95%, in particular between 60% and 85%, preferably between 60% and 70%, of a piston outer diameter of the piston.

In another construction variant, the radially outer piston stage has a stage base, a stage wall and a transition region between the stage base and the stage wall. Preferably, the stage base of the radially outer piston stage is inclined with respect to a notional second plane which intersects with the centre axis at a right angle. Alternatively or additionally, the transition region of the radially outer piston stage is constructed with a predetermined radius. Alternatively or additionally, the stage wall of the radially outer piston stage extends parallel with the centre axis.

In particular, the stage base of the radially outer piston stage and/or the stage wall of the radially outer piston stage may be constructed in a planar manner.

The stage base of the radially outer piston stage may be constructed so as to rise in a radial direction away from the centre axis or to fall away in a radial direction towards the centre axis.

In an embodiment, the stage base of the radially outer piston stage is inclined at an angle between 0° and 60°, in particular between 0° and 45°, preferably between 15° and 45°, with respect to the notional second plane. Alternatively or additionally, the predetermined radius of the transition region of the radially outer piston stage is between a value greater than 0 mm and 10 mm, in particular between 1 mm and 8 mm, preferably between 1.5 mm and 6 mm. Alternatively or additionally, a height of the stage wall of the radially outer piston stage is in a range between a value greater than 0% and 60%, in particular between 0% and 10%, preferably between 1% and 5%, of a maximum depth of the piston recess. The combination of the parameters angle of the inclined stage base, radius of the transition region and height of the recess of the radially outer piston stage have a significant influence on the hydrocarbon emissions and the degree of efficiency which are mutually dependent. The values set out herein for these parameters lead to an optimum compensation between the best possible degree of efficiency and the lowest possible hydrocarbon emissions, as set out in greater detail herein in the description of the embodiment.

In another embodiment, the piston recess has a central protrusion, in particular in the form of a cone tip or a truncated cone, and/or an undercut region which is provided so as to extend annularly about the centre axis. Preferably, the central protrusion and the centre axis may define an angle in a range between 15° and 90°, in particular between 40° and 80°, preferably between 60° and 75°. Alternatively or additionally, the undercut region may have a predetermined radius, in particular in a range between a value greater than 0 mm and 50 mm, in particular between a value greater than 0 mm and 30 mm, preferably between 5 mm and 15 mm. Alternatively or additionally, the central protrusion may have a predetermined radius, in particular in a range between a value greater than 0 mm and 200 mm, in particular between a value greater than 0 mm and 50 mm, preferably between 5 mm and 25 mm. Alternatively or additionally, the central protrusion is recessed in an axial direction along the centre axis with respect to the piston crown face in a range between 2% and 50%, in particular between 4% and 15%, preferably between 5% and 10%, of a maximum depth of the piston recess. Consequently, a particularly advantageous turbulence generation for the part-flow of the injected gas and diesel fuel flowing in the piston recess can be achieved.

In an embodiment, the piston crown face defines at a radially innermost location of the piston crown face an inner diameter which is between 30% and 75%, in particular between 35% and 70%, preferably between 40% and 60%, of a piston outer diameter of the piston. Alternatively or additionally, the piston crown face is constructed in a planar manner. Alternatively or additionally, the piston recess, the piston crown face and/or the plurality of piston stages are constructed in a rotationally symmetrical manner about the centre axis.

In another embodiment, the plurality of piston stages are recessed in an axial direction along the centre axis with respect to the piston crown face and/or raised with respect to the piston recess. Alternatively or additionally, the piston recess is recessed in an axial direction along the centre axis with respect to the piston crown face and/or recessed with respect to the plurality of piston stages.

In particular, there may be provided the piston recess in a state recessed in an axial direction along the centre axis with respect to the beam splitter contour, the beam splitter contour in a state recessed in an axial direction along the centre axis with respect to the radially inner piston stage, the radially inner piston stage in a state recessed in an axial direction along the centre axis with respect to the radially outer piston stage and/or the radially outer piston stage in a state recessed in an axial direction along the centre axis with respect to the piston crown face.

In a construction variant, the piston recess has a maximum depth with respect to the piston crown face. The maximum depth is in a range between 10% and 50%, in particular between 10% and 30%, preferably between 10% and 20%, of a piston outer diameter of the piston.

The present disclosure also relates to an internal combustion engine, in particular an HPDI diesel/gas internal combustion engine, having at least one piston as disclosed herein.

The present disclosure is also directed towards a motor vehicle, in particular utility vehicle (for example, lorry or bus). The motor vehicle has at least one piston as disclosed herein or an internal combustion engine as disclosed herein.

It may also be possible to use the piston disclosed herein for other types of internal combustion engines. For example, the piston disclosed herein may also be used with gas internal combustion engines in which gas fuel is supplied together with air during the inlet cycle via the air inlet channel(s) of the cylinder head and in which diesel fuel is injected, for example, directly into the internal combustion chamber(s) in order to ignite the air/gas fuel admixture.

It may further be possible to use the piston disclosed herein for passenger vehicles, large engines, off-road vehicles, stationary engines, marine engines, etc. The embodiments and features of the present disclosure described above can be combined with each other as desired.

BRIEF DESCRIPTION OF THE DRAWINGS

Further details and advantages of the present disclosure are described below with reference to the appended drawings, in which:

FIG. 5 is a Table with exemplary value ranges for the angles, dimensions and radii indicated in FIGS. 2 to 4.

The embodiments shown in the Figures at least partially correspond so that similar or identical components are given the same reference numerals and for the explanation thereof reference may also be made to the description of the other embodiments or Figures in order to avoid repetition.

DETAILED DESCRIPTION

Figure 1:
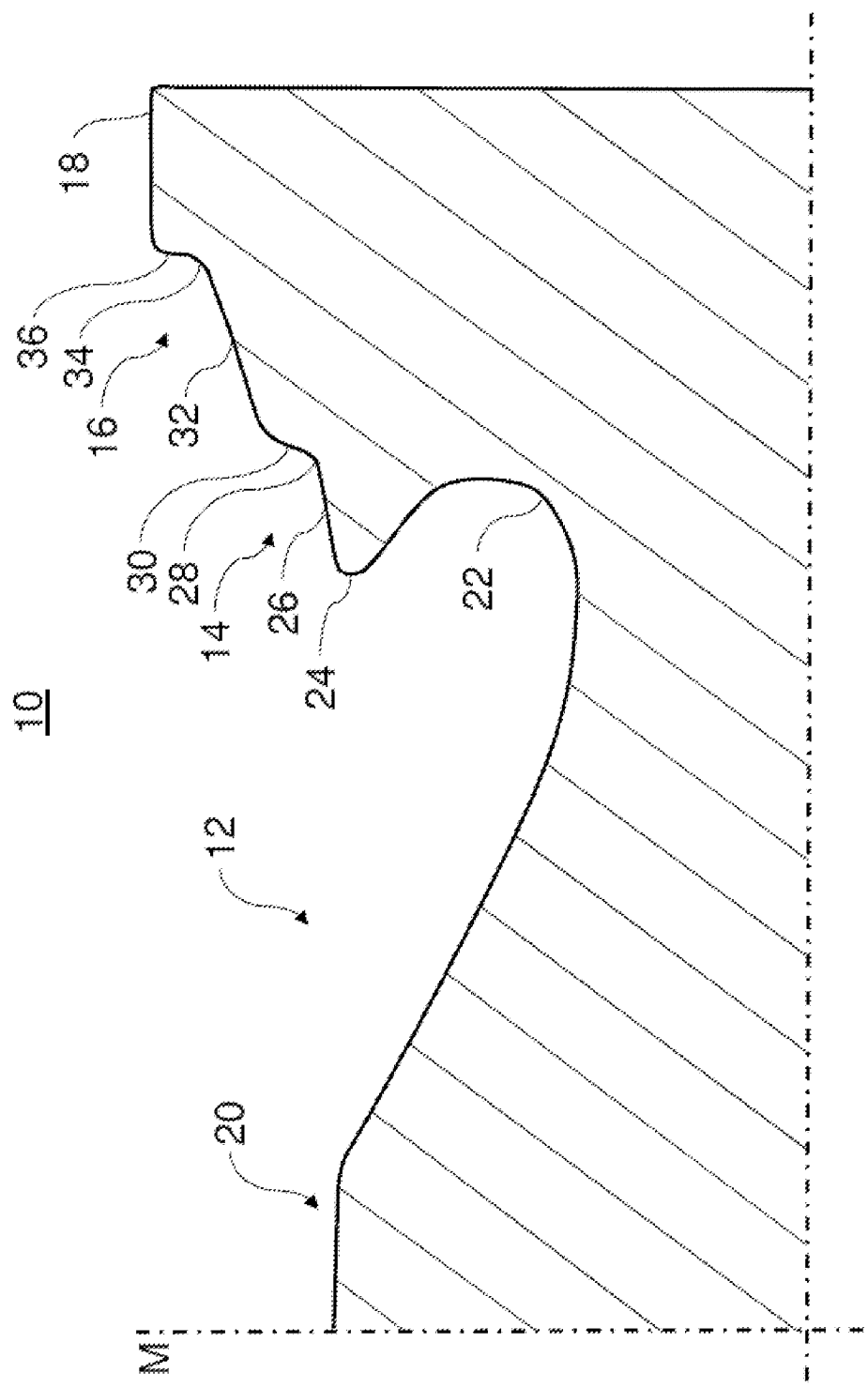
FIG. 1 is a sectioned view of a portion of a piston according to an embodiment of the present disclosure.
Figure 2:
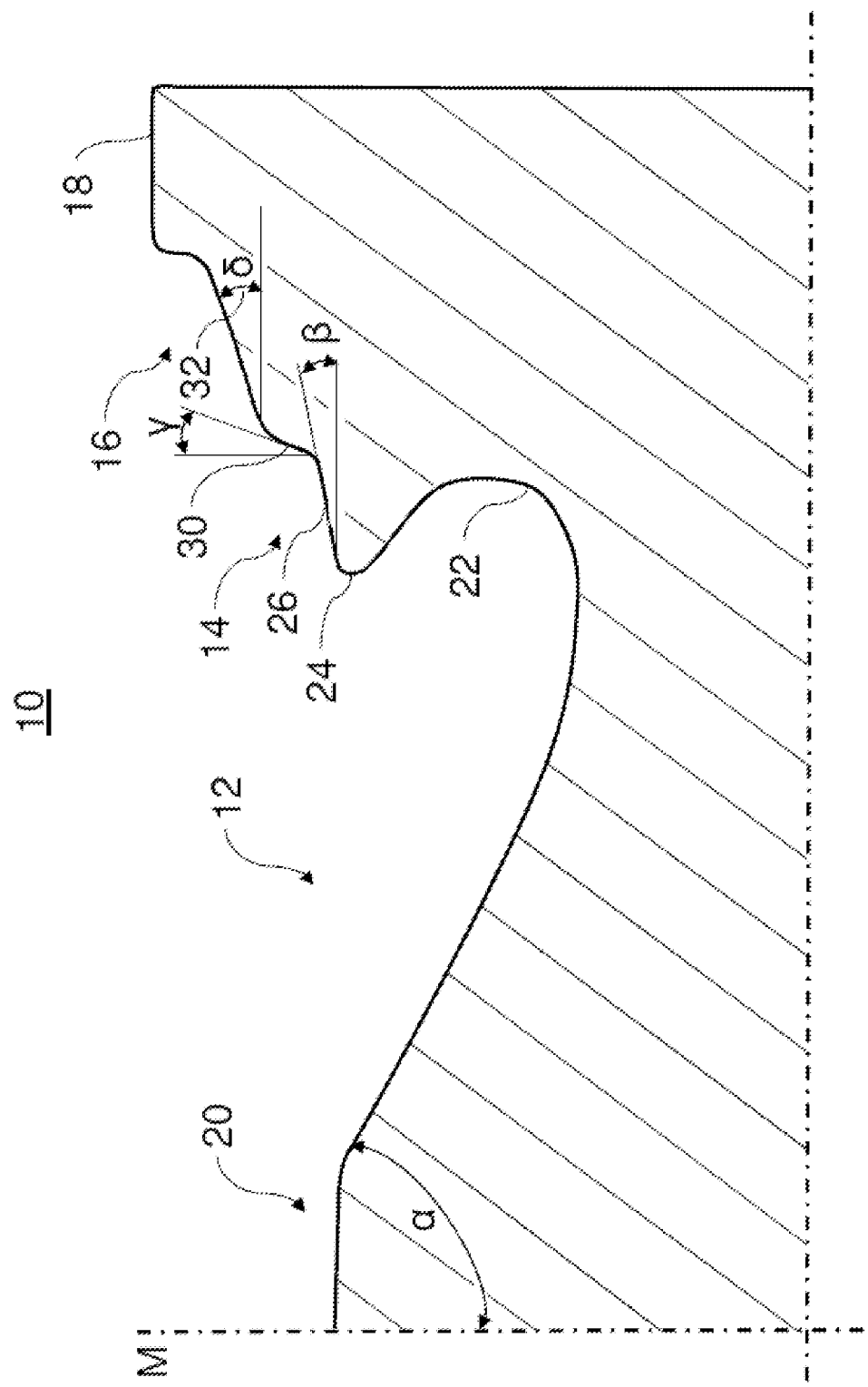
FIG. 2 is a sectioned view of the portion of the exemplary piston with angular indications indicated.
Figure 3:
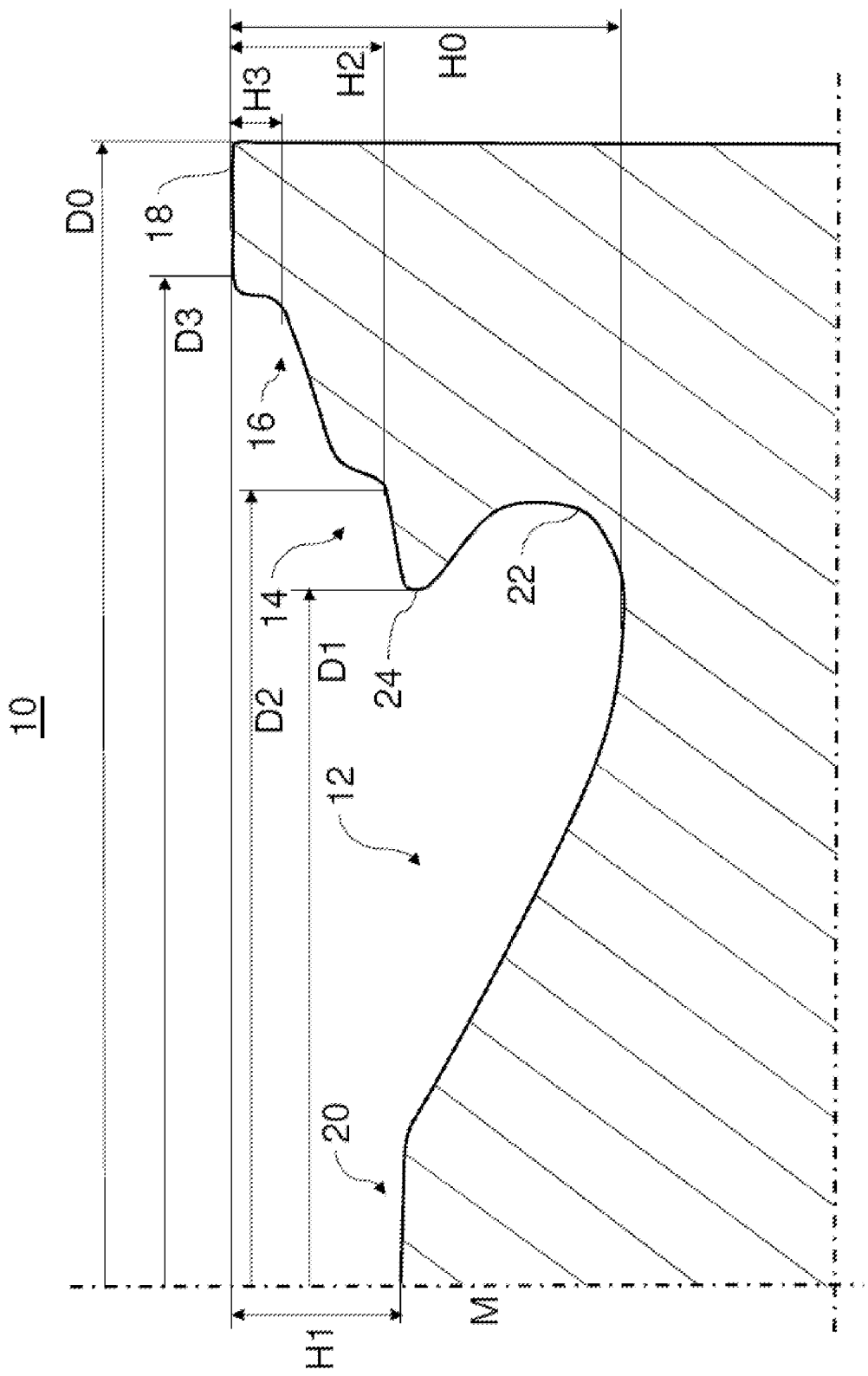
FIG. 3 is a sectioned view of the portion of the exemplary piston with dimensions indicated.
Figure 4:
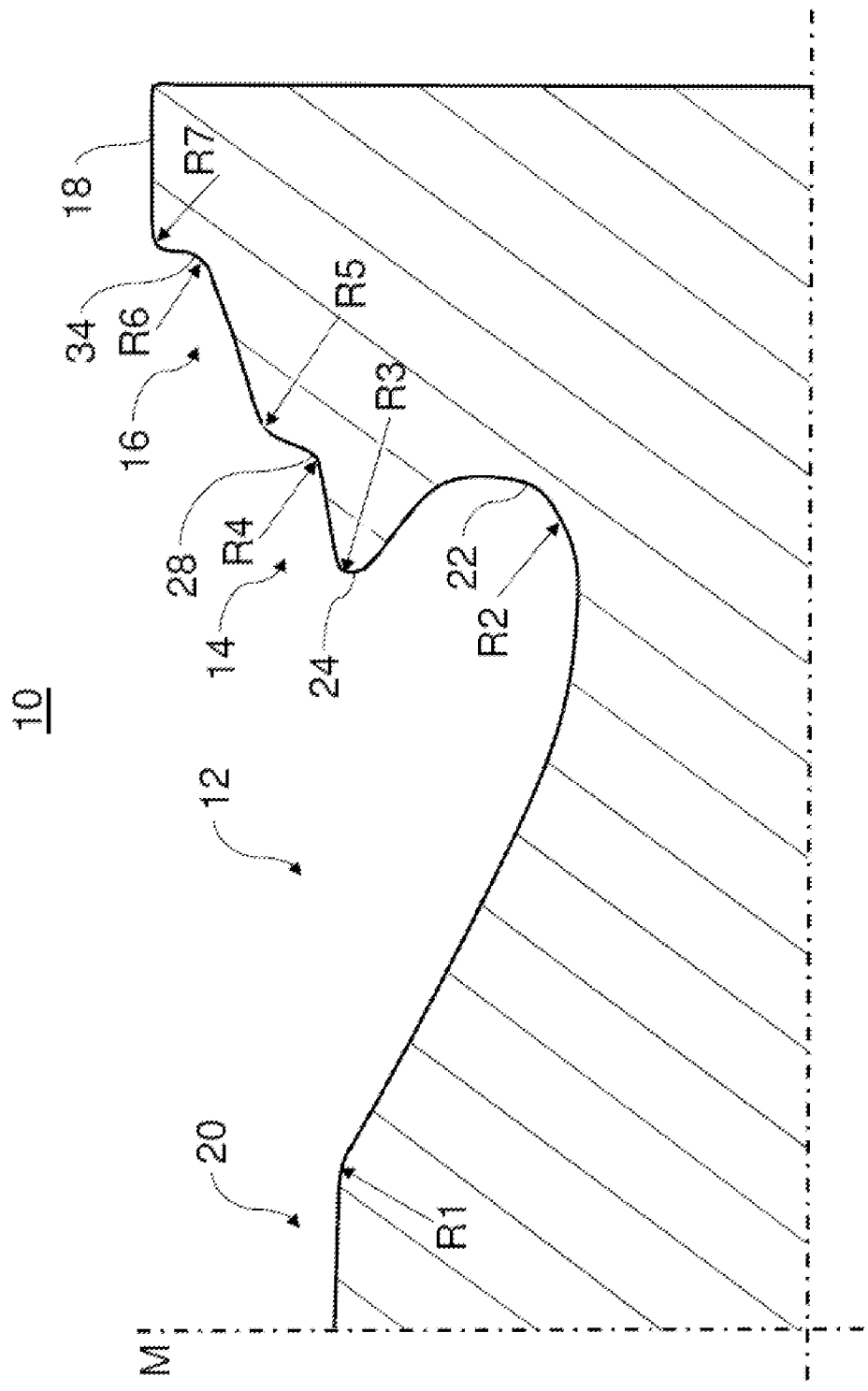
FIG. 4 is a sectioned view of the portion of the exemplary piston with radii indicated.

FIGS. 1 to 4 show a portion of a piston 10. In FIG. 1, the structural regions of the piston 10 are set out. In FIG. 2, particularly relevant angles of the piston 10 are set out. In FIG. 3, particularly relevant dimensions of the piston 10 are set out. In FIG. 4, particularly relevant radii of the piston 10 are set out.

The piston 10 is a reciprocating piston of an internal combustion engine, in particular of a motor vehicle, for example, a utility vehicle. The utility vehicle may, for example, be constructed as a lorry or a bus. The internal combustion engine is in particular a so-called HPDI (high pressure direct injection) diesel/gas internal combustion engine. Such an internal combustion engine is driven by gas fuel which is ignited by means of injection of diesel. In detail, a gas fuel, for example, LNG (liquefied natural gas) can be introduced in gaseous form into the combustion chambers of the internal combustion engine at a high pressure, for example, from 300 bar to 500 bar or more. The gas fuel is ignited in the combustion chambers by means of injected diesel fuel. The diesel fuel is injected as an ignition jet at high pressure directly into the combustion chamber. For example, the diesel fuel may be injected at a pressure of up to 600 bar or more. The combustion of the gas fuel may be carried out in accordance with the diesel cyclical process. In order to introduce the gas fuel and the diesel fuel, it is possible to use, for example, one and the same injector which may be constructed as a dual fuel injector. The injector may be arranged centrally in the cylinder and introduce the diesel and gas fuel in a directed manner onto a so-called beam splitter contour of the piston 10.

The piston 10 is arranged in a cylinder (not shown) of the internal combustion engine and can be moved in translation relative to a cylinder wall of the cylinder. Preferably, the internal combustion engine has a plurality of cylinders which each have a piston 10. The internal combustion engine also comprises a crankshaft which is supported so as to be able to be rotated about a rotation axis relative to the crank housing. The piston 10 is connected in an articulated manner to the crankshaft by means of a connecting rod so that the translational movements of the piston 10 in the cylinder are converted into a rotational movement of the crankshaft about the rotation axis thereof. During the translational upward and downward movements of the piston 10, it can be supported on the cylinder wall.

The piston 10 has a piston recess 12, a plurality of piston stages 14, 16 and a piston crown face 18. In the embodiment shown, the plurality of piston stages advantageously comprise a radially inner piston stage 14 and a radially outer piston stage 16. The piston 10 may be constructed in a rotationally symmetrical manner about a centre axis M.

The piston recess 12 is constructed as a so-called omega recess. The omega recess has in cross-section substantially the shape of the Greek lower case letter "omega" (ω).

The piston recess 12 has a central protrusion 20. The central protrusion 20 is formed as a truncated cone. However, it is, for example, also possible for the central protrusion 20 to be formed as a cone tip.

FIG. 2 shows that the cone shape of the central protrusion 20 forms with the centre axis M of the piston 20 an angle α.

FIG. 3 shows that a covering face of the truncated cone shape of the central protrusion 20 in an axial direction of the centre axis M is recessed by a height H1 with respect to the piston crown face 18.

FIG. 4 shows that the covering face of the truncated cone shape of the central protrusion 20 merges with a radius R1 into a covering face of the truncated cone shape of the central protrusion 20. It is, for example, also possible for a cone covering portion to merge into a cone tip portion of the central protrusion with the radius R1 and/or for the tip of the cone shape with the radius R1 to be rounded.

The piston recess 12 has an undercut region 22. The undercut region 22 extends so as to adjoin the central protrusion 20 in a radial direction away from the centre axis M. The undercut region 22 is constructed so as to extend annularly about the centre axis M.

FIG. 4 shows that the undercut region 22 may be provided with a radius R2.

The piston recess 12, in particular the undercut region 22 of the piston recess 12, merges into a beam splitter contour 24. The beam splitter contour 24 serves in particular to divide the injected diesel fuel ignition jets. In detail, the diesel fuel injection jets are directed towards the beam splitter contour 24. The beam splitter contour 24 divides the ignition jets into a first part-flow and a second part-flow. The first part-flow is redirected along the undercut region 22 in a direction towards the centre axis M. The second part-flow is directed along the piston stages 14 and 16.

The beam splitter contour 24 is constructed as a radial projection. The radial projection is directed in a direction towards the centre axis. The beam splitter contour 24 protrudes over the undercut region 22 in a direction towards the centre axis M. The beam splitter contour 24 is constructed so as to extend annularly about the centre axis M. The beam splitter contour 24 merges into the radially inner piston stage 14.

FIG. 3 shows that the beam splitter contour 24 defines at a radially innermost location of the beam splitter contour an inner diameter D1.

FIG. 4 shows that the beam splitter contour 24 is provided with a radius R3.

The radially inner piston stage 14 is constructed so as to extend annularly about the centre axis M. The radially inner piston stage 14 has a stage base 26, a transition region 28 and a stage wall 30. The stage base 26 merges in a radial direction towards the centre axis M into the beam splitter contour 24. The transition region 28 connects the stage base 26 and the stage wall 30. The stage wall 30 merges in a radial direction away from the centre axis M into the radially outer piston stage 16.

FIG. 2 shows that the stage base 26 is inclined with respect to a first plane which intersects with the centre axis M in a perpendicular manner. The stage base 26 may define an angle 11 with the first plane. FIG. 2 additionally shows that the stage wall 30 is inclined with respect to the centre axis M. The stage wall 30 may define an angle γ with the centre axis M.

In particular, the stage base 26 and the stage wall 30 may merge into each other via the transition region 28 with an obtuse angle (an angle greater than 90° and less than 180°).

FIG. 3 shows that the radially inner piston stage 14, in particular at a transition between the stage base 26 and the transition region 28 (see FIG. 1) defines an inner diameter D2. FIG. 3 also shows that the radially inner piston stage 14, in particular at a transition between the stage base 26 and the transition region 28 (see FIG. 1), along the centre axis M is constructed with a height H2 axially recessed with respect to the piston crown face 18.

FIG. 4 shows that the transition region 28 may be constructed with a radius R4.

The radially outer piston stage 16 is constructed so as to extend annularly about the centre axis M. The radially outer piston stage 16 has a stage base 32, a transition region 34 and a stage wall 36. The stage base 32 merges in a radial direction with respect to the centre axis M into the stage wall 30 of the radially inner piston stage 14. The transition region 34 connects the stage base 32 and the stage wall 36. The stage wall 36 merges in a radial direction away from the centre axis M into the piston crown face 18.

FIG. 2 shows that the step base 32 is inclined with respect to a second plane which intersects with the centre axis M in a perpendicular manner. The stage base 32 may define an angle δ with the second plane.

The stage wall 36 may extend parallel with the centre axis M. In particular, the stage base 32 and the stage wall 36 can merge into each other via the transition region 34 with an obtuse angle (an angle greater than 90° and less than 180°).

FIG. 3 shows that the radially outer piston stage 16, in particular at a transition between the stage wall 36 and the piston crown face 18 (a radially outermost location of the radially outer piston stage 16) define an inner diameter D3. FIG. 3 also shows that the radially inner piston stage 14, in particular at a transition between the stage base 32 and the transition region 34 (see FIG. 1), along the centre axis M is axially recessed with a height H3 with respect to the piston crown face 18.

FIG. 4 shows that the stage wall 30 of the radially inner piston stage 14 merges with a radius R5 into the stage base 32 of the radially outer piston stage 16. FIG. 4 additionally shows that the transition region 34 may be constructed with a radius R6. FIG. 4 also shows that the stage wall 36 of the radially outer piston stage 16 can merge with a radius R7 into the piston crown face 18.

The piston crown face 18 is provided to extend annularly around the centre axis M. The piston crown face 18 is constructed in a planar or flat manner. The piston crown face 18 merges at a radial outer side into a covering face of the piston 10. In the region of the piston crown face 18, during a movement of the piston 10 to the top dead centre, a so-called squish flow which is directed radially inwards towards the centre axis M is produced.

In FIG. 5, exemplary value ranges, preferred value ranges and particularly preferred value ranges for the angles α, β, γ, δ, the heights H0 to H3, the diameters D0 to D3 and the radii R1 to R7 are set out.

It is noted that it has been found that specific combinations of individual parameters (that is to say, angles α, β, γ, δ, the heights H0 to H3, the diameters D0 to D3 and the radii R1 to R7) are particularly preferred, as set out below by way of example.

The parameters D1 (inner diameter on the beam splitter contour 24), R3 (radius of the beam splitter contour 24) and H1 (height of the recess of the beam splitter contour 24) determine the impact location of the gas and diesel jets on the piston 10. As a result of an appropriate combination of these parameters D1, R3 and H1 (cf. Table in FIG. 5), it is consequently possible to select a suitable impact location which assists during the turbulence generation and consequently supports the admixture formation and combustion process. The impact location is selected in such a manner that the part-flows which are produced on impact and which flow into the piston recess 12 and along the piston stages 14 and 16 are approximately the same size. It is also possible for the part-flow into the piston recess to be smaller than the part-flow along the piston stages 14 and 16, for example, in a ratio of 40% to 60%. The division of the part-flows desired in accordance with size can then be used for a suitable turbulence generation.

The turbulence generation is carried out for the first part-flow via the approximately 180° redirection in the undercut region 22 of the piston recess 12 by means of the radius R2 and the angle α. The turbulence generation is carried out for the second part-flow via the breakaway edges produced by the piston stages 14, 16. The shaping of the breakaway edges is adjusted by means of the parameters β (angle of the inclined stage base 26), γ (angle of the inclined stage wall 30), δ (angle of the inclined stage base 32), R4 (radius of the transition region 28), R5 (radius between the piston stages 14, 16). As a result of an appropriate combination of the parameters β, γ, δ, R4 and R5 (cf. Table in FIG. 5), the diffusion of the second part-flow can be directed as desired.

In addition, a swirling combustion method is used, in which the air inlet channels of the cylinder are formed in such a manner that the inlet air is introduced with a swirling action about the vertical axis of the cylinder (corresponds to the centre axis M) in the cylinder.

The combined parameter groups (D1, R3 and H1; α and R2; β, γ, δ, R4 and R5) each enable individually and in combination the fuel and the air to mix particularly well and in a homogeneous manner. In particular, a lean combustion method can be used. The air which is available is effectively used by the combustion method and there are in particular no or hardly any problems with local air shortage zones which lead to incomplete combustion of the fuel.

The parameters δ (angle of the inclined stage base 32), R6 (radius of the transition region 34) and H3 (height of the recess of the radially outer piston stage 16) have in combination a significant influence on the hydrocarbon emissions and the degree of efficiency which are mutually dependent ("Tradeoff"). The parameters δ, R6 and H3 characterise the region of the piston 10 which is furthest away from the centre of the piston 10 or the centre axis M. In this region, in particular the greatest possible conversion of the fuel has to be ensured so that no unburned hydrocarbons remain. If the region characterised by the parameters δ, R6 and H3 is too pronounced, that is to say, for example, if the height H3 is too high, the second part-flow which is flowing along is braked excessively. If, however, this region is not pronounced enough, that is to say, if, for example, the height H3 is too low, the breakaway edge is too small and there is no pronounced turbulence. A suitable combination of the parameters δ, R6 and H3 (cf. Table of FIG. 5) brings about a compromise between the best possible degree of efficiency and lowest possible hydrocarbon emissions.

The parameters R4 (radius of the transition region 28), R5 (radius of the transition between the piston stages 14, 16), γ (angle of the inclined stage wall 30) and the difference of the heights H2-H3 (difference of the recesses of the piston stages 14, 16) have in combination a significant influence on the production of soot during the combustion operation. Soot occurs, for example, when under fuel-rich conditions the fuel is not completely burned. During the combustion, the flame front on the stage wall 30 is braked. This braking effect or wall effect must not be too great since otherwise the combustion is influenced in a negative manner. On the other hand, the stage wall 30 is required in order to constitute a new breakaway edge for the second part-flow. An appropriate combination of the parameters R4, R5, γ and H2-H3 brings about combustion of the fuel with as little soot as possible.

The relationships H2/H0 (height of the recess of the piston stage 14/maximum depth of the piston recess 12), D3/D1 (inner diameter on the piston crown face 18/inner diameter on the beam splitter contour 24) and the parameters α (angle of the central protrusion 20) have in combination a significant influence on the fuel consumption and the formation of nitrogen oxide which are mutually dependent ("Tradeoff"). In particular, the relationships and the angle α relate to a relationship of the piston recess 12 with respect to the region above the piston recess 12, which is delimited by the piston stages 14 and 16. By means of the relationship, in particular a combustion speed and a use of air can be adjusted. A high combustion speed leads to a high degree of combustion efficiency but also to large nitrogen oxide emissions. The nitrogen oxide emissions are produced in particular in zones with temperature peaks. A low combustion speed leads in contrast to a lower degree of combustion efficiency but also to lower nitrogen oxide emissions. An appropriate combination of the relationships H2/H0, D3/D1 and the parameter a (cf. Table of FIG. 5) brings about a compromise between the best possible degree of combustion efficiency and lowest possible nitrogen oxide emissions.

The parameters δ (angle of the inclined stage base 32), R2 (radius of the undercut region 22), R1 (radius at the transition of the central protrusion to the covering face or cone tip) and H1 (height of the recess of the central protrusion 20) act in combination in particular on the carbon monoxide and hydrocarbon emissions, on the duration of combustion and the fuel/air ratio required for the combustion. The parameters δ, R2, R1 and H1 characterise the volume inside the piston recess 20. This volume should preferably not be too large since otherwise zones can be produced in which the fuel is not reached or not completely reached by the flame front and consequently converted. Such zones should instead be filled with piston material. An appropriate combination of the parameters δ, R2, R1 and H1 (cf. Table of FIG. 5) leads to low carbon monoxide and hydrocarbon emissions, optimises the combustion duration and enables a lean combustion method.

The present disclosure is not limited to the embodiments described above. Instead, a large number of variants and modifications which also make use of the notion of the present disclosure and therefore fall within the protective scope are possible. In particular, the present disclosure also claims protection for the subject-matter and the features of the dependent claims regardless of the claims which are referred to. In particular, the features of the independent claims are disclosed independently of each other. In addition, the features of the dependent claims are also disclosed independently of all the features of the independent claims and, for example, independently of the features relating to the presence and/or the configuration of the piston recess, the piston crown face and/or the plurality of piston stages of the independent claims.

LIST OF REFERENCE NUMERALS

10 Piston
12 Piston recess
14 Radially inner piston stage
16 Radially outer piston stage
18 Piston crown face
20 Central protrusion
22 Undercut region 24 Beam splitter contour
26 Stage base
28 Transition region
30 Stage wall
32 Stage base
34 Transition region
36 Stage wall
M Centre axis
R1-R7 Radii
α-γ Angles
H0-H3 Heights
D0-D3 Diameters

The invention claimed is:
1. A piston for an internal combustion engine, comprising:
a piston recess;
a piston crown face which is provided so as to extend annularly about a centre axis (M) of the piston; and
a plurality of piston stages which are provided so as to extend annularly about the centre axis (M) and which are arranged between the piston crown face and the piston recess,
wherein the plurality of piston stages have a radially inner piston stage and a radially outer piston stage;
the radially inner piston stage has a stage base, a stage wall and a transition region between the stage base of the radially inner piston stage and the stage wall of the radially inner piston stage;
the stage base of the radially inner piston stage is inclined with respect to a notional first plane, which intersects with the centre axis (M) at a right angle;
the transition region of the radially inner piston stage is constructed with a predetermined radius (R4);
the stage wall of the radially inner piston stage is inclined with respect to the centre axis (M);
the stage base of the radially inner piston stage and the stage wall of the radially inner piston stage are constructed in a planar manner;
the stage base of the radially inner piston stage and the stage wall of the radially inner piston stage are constructed so as to rise in a radial direction away from the centre axis (M);
the radially outer piston stage has a stage base, a stage wall and a transition region between the stage base of the radially outer piston stage and the stage wall of the radially outer piston stage;
the stage base of the radially outer piston stage is inclined with respect to a notional second plane which intersects with the centre axis (M) at a right angle;
the transition region of the radially outer piston stage is constructed with a predetermined radius (R6);
the stage wall of the radially outer piston stage extends parallel with the centre axis (M);
the stage base of the radially outer piston stage and the stage wall of the radially outer piston stage are constructed in a planar manner; and
the stage base of the radially outer piston stage is constructed so as to rise in a radial direction away from the centre axis.
2. The piston according to claim 1, wherein the internal combustion engine is an HPDI diesel/gas internal combustion engine.
3. The piston according to claim 1, wherein the piston recess is an omega piston recess.
4. The piston according to claim 1, wherein the radially outer piston stage merges in a radial direction with respect to the centre axis (M) into the radially inner piston stage.

5. The piston according to claim 1, wherein:
the radially inner piston stage merges via a beam splitter contour which is provided so as to extend annularly about the centre axis (M) into the piston recess; or
the radially outer piston stage merges into the piston crown face.
6. The piston according to claim 5, wherein the radially outer piston stage merges into the piston crown face in a rounded manner.
7. The piston according to claim 5, wherein:
the beam splitter contour is constructed as a projection which protrudes radially with respect to the centre axis (M); or
the beam splitter contour is provided with a predetermined radius (R3) in a range between a value greater than 0 mm and 30 mm, or between 1 mm and 10 mm, or between 2 mm and 6 mm; or
the beam splitter contour defines at a radially innermost location of the beam splitter contour an inner diameter (D1) which is in a range between 40% and 100%, or between 40% and 80%, or between 40% and 60%, of a piston outer diameter (D0) of the piston; or
the beam splitter contour in an axial direction along the centre axis (M) is recessed with respect to the piston crown face in a range between 0% and 60%, or between 0% and 20%, or between 2% and 10%, of a maximum depth (H0) of the piston recess.
8. The piston as claimed in claim 1, wherein:
the predetermined radius (R4) of the transition region of the radially inner piston stage is between a value greater than 0 mm and 10 mm, or between 1 mm and 8 mm, or between 1.5 mm and 6 mm; or
the stage wall of the radially inner piston stage is inclined at an angle (γ) between 0° and 60°, or between 0° and 45°, or between 15° and 45°, with respect to the centre axis (M); or
the stage wall of the radially inner piston stage merges over a predetermined radius (R5) in a range between a value greater than 0 mm and 10 mm, or a value greater than 0 mm and 8 mm, or between 0.2 mm and 4 mm, into the radially outer piston stage.
9. The piston according to claim 1, wherein:
the stage base of the radially inner piston stage is inclined at an angle (β) between 0° and 60°, or between 0° and 45°, or between 15° and 45°, with respect to the notional first plane; or
the transition region defines at a radially innermost location of the transition region an inner diameter (D2) which is in a range between 50% and 95%, or between 60% and 85%, or between 60% and 70%, of a piston outer diameter (D0) of the piston.
10. The piston according to claim 1, wherein:
the stage base of the radially outer piston stage is inclined at an angle (δ) between 0° and 60°, or between 0° and 45°, or between 15° and 45°, with respect to the notional second plane; or
the predetermined radius (R6) of the transition region of the radially outer piston stage is between a value greater than 0 mm and 10 mm, or between 1 mm and 8 mm, or between 1.5 mm and 6 mm, or
a height (H3) of the stage wall of the radially outer piston stage is in a range between 0% and 60%, or between 0% and 10%, or between 1% and 5%, of a maximum depth (H0) of the piston recess.

11. The piston according to claim 1, wherein:
an undercut region which is provided so as to extend annularly about the centre axis (M), wherein:
the central protrusion and the centre axis (M) define an angle (α) in a range between 15° and 90°, or between 40° and 80°, or between 60° and 75°; or
the undercut region has a predetermined radius (R2) in a range between a value greater than 0 mm and 50 mm, or between a value greater than 0 mm and 30 mm, or between 5 mm and 15 mm; or
the central protrusion has a predetermined radius (R1) in a range between a value greater than 0 mm and 200 mm, or between a value greater than 0 mm and 50 mm, or between 5 mm and 25 mm; or
the central protrusion in an axial direction along the centre axis (M) is recessed with respect to the piston crown face in a range between 2% and 50%, or between 4% and 15%, or between 5% and 10%, of a maximum depth (H0) of the piston recess.

12. The piston according to claim 11, wherein the central protrusion is in the form of a cone tip or a truncated cone.

13. The piston according to claim 1, wherein:
the piston crown face defines at a radially innermost location of the piston crown face an inner diameter (D3) which is between 30% and 75%, or between 35% and 70%, or between 40% and 60%, of a piston outer diameter (D0) of the piston; or
the piston crown face is constructed in a planar manner; or
the piston recess, the piston crown face or the plurality of piston stages are constructed in a rotationally symmetrical manner about the centre axis (M).

14. The piston according to claim 1, wherein:
the plurality of piston stages are recessed in an axial direction along the centre axis (M) with respect to the piston crown face or raised with respect to the piston recess; or
the piston recess is recessed in an axial direction along the centre axis (M) with respect to the piston crown face or recessed with respect to the plurality of piston stages.

15. The piston according to claim 1, wherein:
the piston recess has a maximum depth (H0) with respect to the piston crown face; and
the maximum depth (H0) is in a range between 10% and 50%, or between 10% and 30%, or between 10% and 20%, of a piston outer diameter (D0) of the piston.

16. A high-pressure direct injection (HPDI) diesel/gas internal combustion engine, comprising:
a piston, the piston including,
a piston recess;
a piston crown face which is provided so as to extend annularly about a centre axis (M) of the piston; and
a plurality of piston stages which are provided so as to extend annularly about the centre axis (M) and which are arranged between the piston crown face and the piston recess,
wherein the plurality of piston stages have a radially inner piston stage and a radially outer piston stage;
the radially inner piston stage has a stage base, a stage wall and a transition region between the stage base of the radially inner piston stage and the stage wall of the radially inner piston stage;
the stage base of the radially inner piston stage is inclined with respect to a notional first plane, which intersects with the centre axis (M) at a right angle;
the transition region of the radially inner piston stage is constructed with a predetermined radius (R4);
the stage wall of the radially inner piston stage is inclined with respect to the centre axis (M);
the stage base of the radially inner piston stage and the stage wall of the radially inner piston stage are constructed in a planar manner;
the stage base of the radially inner piston stage and the stage wall of the radially inner piston stage are constructed so as to rise in a radial direction away from the centre axis (M);
the radially outer piston stage has a stage base, a stage wall and a transition region between the stage base of the radially outer piston stage and the stage wall of the radially outer piston stage;
the stage base of the radially outer piston stage is inclined with respect to a notional second plane which intersects with the centre axis (M) at a right angle;
the transition region of the radially outer piston stage is constructed with a predetermined radius (R6);
the stage wall of the radially outer piston stage extends parallel with the centre axis (M);
the stage base of the radially outer piston stage and the stage wall of the radially outer piston stage are constructed in a planar manner; and
the stage base of the radially outer piston stage is constructed so as to rise in a radial direction away from the centre axis.

17. A motor vehicle comprising:
a high-pressure direct injection (HPDI) diesel/gas internal combustion engine; and
a piston, the piston including,
a piston recess;
a piston crown face which is provided so as to extend annularly about a centre axis (M) of the piston; and
a plurality of piston stages which are provided so as to extend annularly about the centre axis (M) and which are arranged between the piston crown face and the piston recess,
wherein the plurality of piston stages have a radially inner piston stage and a radially outer piston stage;
the radially inner piston stage has a stage base, a stage wall and a transition region between the stage base of the radially inner piston stage and the stage wall of the radially inner piston stage;
the stage base of the radially inner piston stage is inclined with respect to a notional first plane, which intersects with the centre axis (M) at a right angle;
the transition region of the radially inner piston stage is constructed with a predetermined radius (R4);
the stage wall of the radially inner piston stage is inclined with respect to the centre axis (M);
the stage base of the radially inner piston stage and the stage wall of the radially inner piston stage are constructed in a planar manner;
the stage base of the radially inner piston stage and the stage wall of the radially inner piston stage are constructed so as to rise in a radial direction away from the centre axis (M);
the radially outer piston stage has a stage base, a stage wall and a transition region between the stage base of the radially outer piston stage and the stage wall of the radially outer piston stage;
the stage base of the radially outer piston stage is inclined with respect to a notional second plane which intersects with the centre axis (M) at a right angle;
the transition region of the radially outer piston stage is constructed with a predetermined radius (R6);

the stage wall of the radially outer piston stage extends parallel with the centre axis (M);

the stage base of the radially outer piston stage and the stage wall of the radially outer piston stage are constructed in a planar manner; and the stage base of the radially outer piston stage is constructed so as to rise in a radial direction away from the centre axis.

* * * * *